United States Patent [19]

Braksmayer et al.

[11] 4,341,696

[45] Jul. 27, 1982

[54] TRIS-(3-HYDROXYALKYL) PHOSPHINE OXIDE FLAME RETARDANT COMPOSITIONS

[75] Inventors: Diza P. Braksmayer; Syed N. Hussain, both of Plainsboro, N.J.

[73] Assignee: FMC Corporation, Philadelphia, Pa.

[21] Appl. No.: 116,334

[22] Filed: Jan. 28, 1980

[51] Int. Cl.$^3$ ............................................... C08K 5/53
[52] U.S. Cl. .................................... 524/139; 524/606; 568/15
[58] Field of Search ....................... 260/45.95 L, 606.5

[56] References Cited

U.S. PATENT DOCUMENTS

| | | | |
|---|---|---|---|
| 3,076,034 | 1/1963 | Gordon | 260/45.95 |
| 3,099,684 | 7/1963 | Rauhut et al. | 260/135 |
| 3,267,149 | 8/1966 | Garner | 260/606.5 |
| 3,269,963 | 8/1966 | Ilgemann et al. | 260/3.5 |
| 3,306,937 | 2/1967 | Clampitt et al. | 260/606.5 |
| 3,341,625 | 9/1967 | Gillham et al. | 260/887 |
| 3,346,647 | 10/1967 | Garner | 260/606.5 |
| 3,434,981 | 3/1969 | Baranaukas et al. | 260/606.5 |
| 3,489,811 | 1/1970 | Drucker et al. | 260/606.5 |
| 3,629,365 | 12/1971 | Gardner | 260/857 PE |
| 3,654,342 | 4/1972 | Gillham et al. | 260/468.8 |
| 3,666,543 | 5/1972 | Maier | 260/606.5 |
| 3,683,028 | 8/1972 | Hans | 260/606.5 P |
| 3,716,580 | 2/1973 | Maier | 260/488 J |
| 3,736,349 | 5/1973 | Gillham et al. | 260/486 R |
| 3,931,104 | 1/1976 | Luders et al. | 260/45.85 R |
| 3,948,980 | 4/1976 | Dettmeier et al. | 260/488 J |
| 3,970,636 | 7/1976 | Hardy et al. | 260/45.7 |
| 4,007,229 | 2/1977 | Hechenbleikner | 260/606.5 P |
| 4,056,571 | 11/1977 | Kleiner | 260/583 E |
| 4,087,408 | 5/1978 | Moedritzer | 260/47 P |

FOREIGN PATENT DOCUMENTS 2605307 8/1976 Fed. Rep. of Germany .
1028158 5/1966 United Kingdom .

Primary Examiner—V. P. Hoke
Attorney, Agent, or Firm—Robert W. Kell; Eugene G. Horsky

[57] ABSTRACT

Glass filled thermoplastic polyamide polymers such as nylon 6/6 are rendered fire retardant by the addition of an effective amount of a tris-(3-hydroxyalkyl) phosphine oxide such as tris-(3-methyl-3-hydroxypropyl) phosphine oxide.

22 Claims, No Drawings

TRIS-(3-HYDROXYALKYL) PHOSPHINE OXIDE FLAME RETARDANT COMPOSITIONS

The present invention relates to glass filled thermoplastic polyamide polymers which are rendered flame retardant by having combined therewith an effective amount of a tris-(3-hydroxyalkyl) phosphine oxide.

The polyamide nylon 6/6 was one of the first engineering thermoplastics, so called because of its highly rated mechanical, thermal, and electrical properties to which standard metal design methodology could be applied to yield parts having predictable short and long-term performance characteristics. Since 1955 other polyamides, i.e., nylon 6, 6/6, 6/10, 6/12, 6/9, 11, 12 and copolymers like 6/66 have been introduced. However, nylon 6/6 and 6 have always dominated the polyamide market and account for the majority of nylons used as engineering thermoplastics.

With the current and future federal requirements obligating automotive manufacturers to improve the efficiency of their product and reduce fuel consumption, there is a substantial growth in the use of engineering plastics as a replacement for metal to achieve weight reduction. At the present time, nylon is the dominant engineering thermoplastic for transportation end uses.

Polyamides such as thermoplastic nylons, are in general, characterized as being relatively stable thermally upon long exposure to processing temperatures and shear. Upon exposure to flame, however, they burn quite readily. The flammability is characterized by dripping behavior of the burning nylons. There is a substantial and increasing demand for flame retardant nylon.

To meet flame retardant requirements, nylon is customarily compounded with flame retardant additives, i.e., organic halogen compounds plus antimony oxide; the most often used combination being 17–20% of a polychloro bicyclic hydrocarbon plus 5% antimony trioxide. Sometimes iron oxide is used with the organohalogen compound. Red phosphorus has also been used as a flame retardant for nylon. Such additives, however, frequently degrade or cause degradation under processing conditions (extrusion at about 250° C.) resulting in poor mechanical performance of the thermoplastic nylons themselves.

The known flame retardants for nylon such as haloalkyl phosphates, suffer generally from one or more deficiencies including low compatibility, low thermal stability or poor fire retardant behavior in molded nylon components. Additionally, a serious problem posed by organohalogen flame retardants in nylon is attributable to acid formation, either due to or arising from light exposure or thermal degradation with the released acid then attacking metal components in end-use applications. Some organohalogen compounds are contraindicated as fire retardant additives due to toxicity problems of the compound, i.e., mutagenicity.

The present invention is predicated upon the discovery that the addition of a small but effective amount of a tris-(3-hydroxyalkyl) phosphine oxide having the formula:

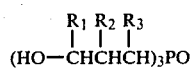

wherein $R_1$ and $R_3$ are any radical selected from the group consisting of hydrogen phenyl and alkyl radicals of 1 to 4 carbon atoms and $R_2$ is any radical selected from the group consisting of hydrogen phenyl and alkyl radicals of 2 to 4 carbon atoms, provided that when $R_1$ and $R_3$ are hydrogen radicals, $R_2$ is either an alkyl radical of 2 to 4 carbon atoms or a phenyl radical, to a glass filled thermoplastic polyamide substantially improves the flame retardant properties of the polyamide. The addition of a tris-(3-hydroxyalkyl) phosphine oxide to the polyamide in the amount required to improve flame retardant properties does not adversely modify the physical properties of the polyamide to a point where its commercial use is impaired. The tris-(3-hydroxyalkyl) phosphine oxides described above are readily compatible with the polyamide and effective when added in small quantities, i.e., 10–25 parts per hundred. Particularly preferred compositions are flame retardant nylon molding resins to which have been added from about 14 to about 21 parts per hundred of a tris-(3-hydroxyalkyl) phosphine oxide.

The flame resistant polyamide-tris-(3-hydroxyalkyl) phosphine oxide blends of the present invention are particularly advantageous for use in the internal circuitry of appliances, business machines, terminal strips, connectors and blocks.

The tris-(3-hydroxyalkyl) phosphine oxides of the present invention are more soluble in water than in polar organic solvents such as chloroform. Such tris-(3-hydroxyalkyl) phosphine oxides combine high compatibility in polyamides with high thermal stability and excellent fire retardant efficiency either alone or in combination with organohalogen products.

The addition of a tris-(3-hydroxyalkyl) phosphine oxide to glass filled polyamide such as the various polyamides referred to above, improves mixing parameters and reduces polymer degradation by lowering the processing temperature of the polyamide. Although the present invention is not to be limited by any theoretical assumption, it is believed that one possible mechanism by which tris-(3-hydroxyalkyl) phosphine oxide imparts flame resistance is by reaction of the hydroxyl groups upon pyrolysis with the amide linkages in the polymer chain to yield a very tough crosslinked foamed and thermally insulating char, which surpresses further resin pyrolysis at the flame front and also eliminates the dripping behavior of the polymer under combustion conditions. The merits that may be attributed to such tris-(3-hydroxyalkyl) phosphine oxide flame retardant (relative to conventional flame retardant agents in present use) include no corrosion, high ultraviolet stability, nontoxicity and minimal adverse change in the physical properties of the polymer.

In addition to providing fire resistance to molded glass filled polyamide parts, the tris-(3-hydroxyalkyl) phosphine oxides may also be present in nylon fibers making them flame retardant, more resistant to dirt and static build up and rendering the fibers less hydrophobic, thereby improving the wearability. Flame retardant treatments for conventional nylon fabrics are seldom used in practice suggesting the lack of effective treatments for nylon fabrics. The addition of tris-(3-hydroxyalkyl) phosphine oxides to nylon to be used in the manufacture of floor covers is particularly advantageous.

Tris-(3-hydroxyalkyl) phosphine oxide may be prepared by first reacting a 3-hydroxy-1,2-unsaturated olefin such as 1-butene-3-ol or 2-butene-3-ol with phosphine in the presence of a free radical catalyst as described in U.S. Pat. No. 3,489,811. We have discovered that the use of stoichiometric quantities of reactants (or as little as 4% excess alcohol) reduce the formation of higher molecular weight by-products. The tris-(3-hydroxyalkyl) phosphine obtained by this process is readily converted to the corresponding phosphine oxide by oxidation with hydrogen peroxide.

Phosphine oxides having different 3-hydroxyalkyl groups on the phosphorus atom such as:

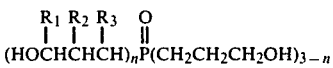

wherein $R_1$ and $R_3$ are any radical selected from the group consisting of hydrogen phenyl and alkyl radicals of 1 to 4 carbon atoms and $R_2$ is any radical selected from the group consisting of hydrogen phenyl and alkyl radicals of 2 to 4 carbon atoms, provided that when $R_1$ and $R_3$ are hydrogen radicals, $R_2$ is either an alkyl radical of 2 to 4 carbon atoms or a phenyl radical, and n is either 1 or 2, may be prepared by reacting phosphine with a mixture of allyl alcohol and an alcohol having the formula:

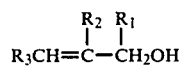

wherein $R_1$, and $R_3$ are any radical selected from the group consisting of hydrogen phenyl and alkyl radicals of 1 to 4 carbon atoms and $R_2$ is any radical selected from the group consisting of hydrogen phenyl and alkyl radicals of 2 to 4 carbon atoms, provided that when $R_1$ and $R_3$ are hydrogen radicals, $R_2$ is either an alkyl radical of 2 to 4 carbon atoms or a phenyl radical, and oxidizing the resulting product. These mixed phosphine oxides as well as physical mixtures of such mixed phosphine oxides with tris-hydroxyalkyl phosphine oxides such as tris-(3-hydroxypropyl) phosphine oxide and/or tris-(3-hydroxy-2-methylpropyl) phosphine oxide are useful additives having application in the present invention.

As indicated above, the less common hydroxy-olefins may be reacted with phosphine to form a 3-hydroxyalkyl phosphine that may be oxidized to the corresponding phosphine oxide. Examples are 2-butene-1-ol, 1-butene-3-ol, 2-heptene-1-ol, cinnamyl alcohol, 2-butyl 2-propene-1-ol butene-2-diol-(1,4) and 2-hydroxymethylpropene-1-ol-3. The resulting products, are more costly to manufacture and have the disadvantage of containing less phosphorus than the preferred additives of the present invention.

The following examples will more fully illustrate the invention.

EXAMPLE 1

Preparation of Tris-(3-Methyl-3-Hydroxypropyl) Phosphine Oxide

Tris-(3-methyl-3-hydroxypropyl) phosphine may be prepared by the method described in Example 1 of U.S. Pat. No. 3,489,811.

Into a one liter pressure reactor is placed 381.6 g (5.3 moles) 1-butene-3-ol and 20 ml of a solution containing 3 g azobisisobutyronitrile dissolved in 100 ml of 1-butene-3-ol. The pressure reactor is closed and charged with 36 g (1.06 moles) of phosphine. The reaction mixture is agitated by rocking the reactor for two hours at 80° C. The reaction mixture is permitted to cool to room temperature and the pressure vessel is vented in a hood to release any unreacted phosphine. An additional 20 ml of the azobisisobutyronitrile solution described above is added to the reactor which is closed and the system is again heated to 80° C. and rocked for one hour. The addition of 20 ml of the azobisisobutyronitrile solution is repeated with intermediate agitation at 80° C. for one hour under pressure until all of the azobisisobutyronitrile solution (100 ml) has been added. The contents of the reactor are then heated to 80° C. under pressure and rocked for an additional five hours.

The solution that results from the above reaction may be vacuum distilled by heating to about 85° C./1 mm Hg and maintaining at that temperature and pressure for about four hours to remove volatiles.

The non-volatile residue may be dissolved in an equal volume of a 50:50 mixture of isopropanol/methanol and oxidized by stirring with the dropwise addition of a 30% aqueous hydrogen peroxide solution diluted with an equal volume of isopropanol. When the exothermic reaction subsides, the solution of phosphine oxide is tested by adding one drop of the solution to 1 ml of carbon disulfide until no red coloration can be detected visually in the carbon disulfide layer. This indicates complete oxidation of the phosphine to the phosphine oxide.

Following oxidation with hydrogen peroxide, the solvents (water, isopropanol and methanol) are removed from the reaction product by heating to 65° C. under vacuum. The product which remains, tris-(3-methyl-3-hydroxypropyl) phosphine oxide is a useful fire retardant additive for glass filled polyamide resins.

EXAMPLE 2

Preparation of Tris-(1-methyl-3-Hydroxypropyl) Phosphine Oxide

Example 1 above may be repeated using a stoichiometric amount of 2-butene-1-ol (crotyl alcohol). Four hundred and fifty grams (13.23 moles) phosphine may be reacted with 2,858 g (39.69 moles) of 2-butene-1-ol in the presence of 30 g azobisisobutyronitrile over a period of nine hours. The temperature varies over a range of 25° C.–170° C. and the pressure over a range of 600 psig to 60 psig. Heating the reaction product to 170° C. at 10 mm Hg pressure will remove volatiles and the residue may be oxidized with hydrogen peroxide (11.90 moles) over two hours at a temperature up to 104° C. The solvents may be removed by heating to 65° C. under vacuum. The residue is a useful fire retardant for glass filled polyamide resins.

EXAMPLE 3

Preparation of 3-Hydroxypropyl bis-(1-methyl-3-hydroxypropyl) Phosphine Oxide

3-Hydroxypropyl bis-(1-methyl-3-hydroxypropyl) phosphine may be prepared by the method described in Example 1 above.

Into a four liter pressure reactor equipped with a stirrer and thermometer is placed 162.4 g (2.8 moles) of allyl alcohol, 403.2 g (5.6 moles) 2-butene-1-ol and 40 ml of a solution containing 9 g azobisisobutyronitrile dissolved in 900 ml of toluene. The pressure reactor is closed and charged with 96 g (2.8 moles) of phosphine. The reaction mixture is heated with stirring to 60° C. at which temperature the reaction becomes exothermic and the temperature rises. Stirring is continued and the temperature is maintained at 90° C. with heating and stirring for one hour at which time 50 ml of the azobisisobutyronitrile solution in toluene is pumped into the reactor. The reaction mixture is maintained at 90° C. for one hour with stirring after the second addition of catalyst. The addition of 50 ml of the azobisisobutyronitrile solution is repeated with continuous stirring at 90° C. each hour until all of the azobisisobutyronitrile solution (200 moles) has been added. The contents of the reactor are then stirred while maintaining the temperature at 90° C. for an additional four hours after the pressure in the reaction vessel has dropped to 0 psig.

The reaction mixture may be cooled to room temperature, removed from the reaction vessel and heated up to 35° C. at 2 mm Hg to distill off the volatile components.

The non-volatile residue may be dissolved in an equal volume of isopropanol and chilled on ice. The phosphine present in solution is oxidized by the dropwise addition with stirring of a 30% aqueous hydrogen peroxide solution diluted with an equal volume of isopropanol. Inasmuch as the oxidation reaction is exothermic, the course of the reaction may be followed by the temperature increase upon addition of hydrogen peroxide. When the exotherm subsides, a small aliquot of the reaction mixture is tested after each addition of hydrogen peroxide with hydrogen peroxide test paper and by addition of few drops of the reaction mixture to 1 cc of carbon disulfide. At the end of the oxidation reaction, the observed red color of the carbon disulfide indicative of unoxidized phosphine, disappears and the hydrogen peroxide test paper indicates the presence of hydrogen peroxide.

When the oxidation of the phosphine to phosphine oxide has been completed, the water and isopropanol are removed from the phosphine oxide by heating to 65° C. at 2 mm Hg until all volatiles have distilled off. The residue is a useful fire retardant additive for nylon resins.

In a similar manner, 1-methyl-3-hydroxypropyl bis-(3-hydroxypropyl) phosphine oxide may be prepared by reacting 2 moles of allyl alcohol and 1 mole of 2-butene-1-ol with 1 mole of phosphine and oxidizing the reaction product.

EXAMPLE 4

Effect of Tris-(3-Hydroxyalkyl) Phosphine Oxides As A Flame Retardant For Polyamide Resins Each of the phosphine oxides described above in Examples 1, 2 and 3 are added to individual samples of a nylon resin in amounts of 15-20 parts per hundred parts of resin (PHR) and dispersed throughout the resin. Mixing of the additive and resin may be accomplished in a Brabender type mixer (HAAKE RHEOMIX MODEL 600 with REOCORD EU10 attachment, manufactured by Haake Inc., 244 Saddle River Road, Saddle Brook, N.J. 07662). The mixing can take place at 265° C. at which temperature some of the additive is volatilized.

In testing the polyamide polymer compositions containing a flame retardant additive, the flame retardant properties are determined following procedures established by the Underwriter Laboratories Bulletin No. 94, Standard for Tests for Flammability of Plastic Materials for Parts in Devices and Appliances; Second Edition, Second Impression (as revised to Feb. 1, 1974) dated July 30, 1976. The Vertical Burning Test for classifying Materials 94 V-0, 94 V-1 or 94 V-2 and described in Section 3 of this publication is used. The phosphine oxides described in Examples 1, 2 and 3 when added to glass filled polyamide resins in amounts of 15 to 20 part per hundred provide products that are classified V0 or V1 by the Vertical Burn Test described above.

The invention in its broader aspects is not limited to the specific details shown and described but departure may be made from such details within the scope of the accompanying claims without departing from the principles of the invention and without sacrificing its chief advantage.

We claim:

1. A glass filled thermoplastic polyamide polymer rendered flame retardant by having combined therewith an effective amount of a tris-(3-hydroxyalkyl) phosphine oxide having the formula:

$$(HOCHCHCH)_3PO$$

wherein $R_1$ and $R_3$ are any radical selected from the group consisting of hydrogen, phenyl and alkyl radicals of 1 to 4 carbon atoms and $R_2$ is any radical selected from the group consisting of hydrogen, phenyl and alkyl radicals of 2 to 4 carbon atoms, provided that when $R_1$ and $R_3$ are hydrogen radicals, $R_2$ is either an alkyl radical of 2 to 4 carbon atoms or a phenyl radical.

2. The flame retardant polymer of claim 1 wherein the phosphine oxide is tris-(1-methyl-3-hydroxypropyl) phosphine oxide.

3. The flame retardant polymer of claim 1 wherein the phosphine oxide is tris-(1-phenyl-3-hydroxypropyl) phosphine oxide.

4. The flame retardant polymer of claim 1 wherein the phosphine oxide has the formula:

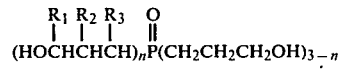

$$(HOCHCHCH)_nP(CH_2CH_2CH_2OH)_{3-n}$$

wherein $R_1$ and $R_3$ are any radical selected from the group consisting of hydrogen, phenyl and alkyl radicals of 1 to 4 carbon atoms and $R_2$ is any radical selected from the group consisting of hydrogen, phenyl and alkyl radicals of 2 to 4 carbon atoms, provided that when $R_1$ and $R_3$ are hydrogen radicals, $R_2$ is either an alkyl radical of 2 to 4 carbon atoms or a phenyl radical and n may be 1 or 2.

5. The flame retardant polymer of claim 4 wherein the phosphine oxide is 3-hydroxypropyl bis-(1-methyl-3-hydroxypropyl) phosphine oxide.

6. The flame retardant polymer of claim 4 wherein the phosphine oxide is 1-methyl-3-hydroxypropyl bis(3-hydroxpropyl) phosphine oxide.

7. The flame retardant polymer of claim 4 wherein the phosphine oxide is a mixture of 3-hydroxypropyl bis-(1-methyl-3-hydroxypropyl) phosphine oxide and bis(3-hydroxypropyl) 1-methyl-3-hydroxypropyl phosphine oxide.

8. The flame retardant polymer of claim 1 wherein said thermoplastic polyamide is nylon 66.

9. The flame retardant polymer of claim 1 wherein said thermoplastic polyamide is nylon 6.

10. The flame retardant polymer of claim 1 to which has been added about 10-25 parts per hundred of tris-(1-methyl-3-hydroxypropyl) phosphine oxide.

11. The flame retardant polymer of claim 1 to which has been added about 14–21 parts per hundred of tris-(1-methyl-3-hydroxypropyl) phosphine oxide.

12. A method of manufacturing a flame retardant glass filled polyamide polymer which comprises adding thereto an effective amount of a tris-(3-hydroxyalkyl) phosphine oxide having the formula:

$$(\overset{R_1}{\underset{|}{HOCH}}-\overset{R_2}{\underset{|}{CH}}-\overset{R_3}{\underset{|}{CH}})_3 PO$$

wherein $R_1$ and $R_3$ are any radical selected from the group consisting of hydrogen, phenyl and alkyl radicals of 1 to 4 carbon atoms and $R_2$ is any radical selected from the group consisting of hydrogen, phenyl and alkyl radicals of 2 to 4 carbon atoms, provided that when $R_1$ and $R_3$ are hydrogen radicals, $R_2$ is either an alkyl radical of 2 to 4 carbon atoms or a phenyl radical and distributing the phosphine oxide throughout said polyamide polymer.

13. The method of claim 12 wherein the phosphine oxide is tris-(1-methyl-3-hydroxypropyl) phosphine oxide.

14. The method of claim 12 wherein the phosphine oxide is tris-(1-phenyl-3-hydroxypropyl) phosphine oxide.

15. The method of claim 12 wherein the phosphine oxide has the formula:

$$(\overset{R_1}{\underset{|}{HOCHCHCH}})_n \overset{O}{\underset{\|}{P}}(CH_2CH_2CH_2OH)_{3-n}$$

wherein $R_1$ and $R_3$ are any radical selected from the group consisting of phenyl and alkyl radicals of 1 to 4 carbon atoms and $R_2$ is any radical selected from the group consisting of phenyl and alkyl radicals of 2 to 4 carbon atoms, provided that when $R_1$ and $R_3$ are hydrogen radicals, $R_2$ is either an alkyl radical of 2 to 4 carbon atoms or a phenyl radical and n may be 1 or 2.

16. The method of claim 15 wherein the phosphine oxide is 3-hydroxypropyl bis-(1-methyl-3-hydroxypropyl) phosphie oxide.

17. The methd of claim 15 wherein the phosphine oxide is 1-methyl-3-hydroxypropyl bis-(3-hydroxypropyl) phosphine oxide.

18. The method of claim 15 wherein the phosphine oxide is a mixture of 3-hydroxypropyl bis-(1-methyl-3-hydroxypropyl) phosphine oxide and bis-(3-hydroxypropyl) 1-methyl-3-hydroxypropyl phosphine oxide.

19. The method of claim 12 wherein said polyamide polymer is nylon 66.

20. The method of claim 12 wherein said polyamide polymer is nylon 6.

21. The method of claim 12 wherein about 14 to 21 parts per hundred of tris-(1-methyl-3-hydroxyalkyl) phosphine oxide are added to the polyamide polymer.

22. The method of claim 12 wherein about 5 to 25 parts per hundred of tris-(1-methyl-3-hydroxypropyl) phosphine oxide are added to the polyamide polymer.

* * * * *